3,427,275
VINYL AROMATIC-ACRYLIC COPOLYMERS AND PROCESS OF PRODUCING THE SAME

Bernard J. Davis, Biloxi, and Wesley J. Ranson, Gulfport, Miss., assignors to Reichhold Chemicals, Inc., White Plains, N.Y.
No Drawing. Filed Aug. 16, 1967, Ser. No. 660,929
U.S. Cl. 260—31.8       8 Claims
Int. Cl. C08f 15/40, 45/40, 1/08

---

ABSTRACT OF THE DISCLOSURE

The present application discloses a resin produced by reacting (A) a mixture of monomers consisting essentially of from (1) about 30%–40% by weight of alpha methyl styrene, (2) about 50%–60% by weight of a member of a group consisting of vinyl toluene and styrene and mixtures thereof and (3) about 2%–15% by weight of at least one member selected from the group consisting of acrylic esters, methacrylic esters, acrylic acid, methacrylic acid and mixtures thereof, with (B) triphenylphosphite and mercaptan in an inert solvent.

---

The invention relates to resinous copolymers of vinyl aromatics and acrylic species and to their production.

An object of the invention is to provide hard terpolymers of vinyl toluene, alpha methyl styrene and 2-ethyl hexyl acrylate that are of light color, of excellent solubility in a variety of solvents particularly aliphatic solvents, that are easily prepared, and which can be modified to provide useful polymer systems that exhibit ring and ball softening points ranging from 5° C. to 140° C.

A further object is to provide a method of making copolymers in accordance with the foregoing object that is simple, easily practiced, results in good yields, and may be performed in batch or continuous processes.

The copolymers are preferably formed by contacting alpha methyl styrene, vinyl toluene and 2-ethyl hexyl acrylate with triphenyl phosphite, in the presence of n-dodecyl mercaptan as a terminating agent and molecular weight control agent. For certain purposes it is preferred that the reactants be employed in the proportion of 37% alpha methyl styrene, 58% vinyl toluene, and 5% 2-ethyl hexyl acrylate, with 0.1% triphenyl phosphite and 0.5% mercaptan.

These proportions are productive of copolymers that are optimum in clarity, solubility and yield. These proportions may be varied at will, but at the expense of yield and solubility characteristics. The individual vinyl toluene isomers or mixed isomers can be employed.

If resins not soluble in aliphatics are desired, styrene can be used to replace the vinyl toluene in part or in total. This produces resins that require aromaticity of solvent system in direct proportion to the amount of styrene used to replace the vinyl toluene. These resins are characterized by water white color and are particularly useful in hot melt adhesive systems, wherein the hot bond strength is directly proportional to the percentage of styrene replacing the vinyl toluene.

The character of the resin may thus be controlled in various ways. For example, if a more brittle type of resin is desired, a lower acrylic or methacrylic ester can be employed, down to ethyl acrylate or ethyl methacrylate. The use of methacrylate esters instead of acrylate esters provide a more oil soluble system but are generally more brittle. Hence, 2-ethyl hexyl methacrylate provides a more brittle resin than does 2-ethyl hexyl acrylate. Acrylate and methacrylate esters up to the stearyl esters can be employed. Also, dialkyl fumarates or maleates can be employed, but these generally do not provide the water white systems obtained from the acrylates.

Acrylic or methacrylic acid may be employed in varying percentages to provide final water white polymers that are soluble in aromatics, aliphatic-alcohol mixtures and compatible with film formers such as nitrocellulose and an extremely broad range of alkyds, and ureas and melamine modified alkyds. These particular polymers exhibit remarkable pigment wetting efficiency.

In order to control the vigor of the reaction, a solvent is employed to predissolve the monomers. These solvents may be aliphatic or aromatic hydrocarbons. We prefer a solvent such as Solvesso 150, a narrow range aromatic solvent prepared from petroleum available from Esso Standard Oil Company. Typical of such aromatics, they exert a chain transfer effect during polymerization to produce more uniform polymers than do the aliphatic solvents, though any aliphatic or aromatic naphthas, mixtures of these naphthas, aromatics such as benzene, toluene, xylene or higher alkyl benzenes can be employed alone or in admixture with any of the aforementioned solvents. The solvent is used at the rate of 10–50 by weight of the monomers employed with 10–20 percent being preferred.

The character of the polymer is also affected by the rate of rise of temperature during polymerization. In general, too rapid a rise in temperature provides a lower softening point, than does a slow controlled rate of rise during the polymerization period.

The solvents used should be free of resin forming materials or contaminants, since the presence of such bodies cause detrimental color. The solvent once used however can be reused with no deleterious effects. Similarly, the monomers employed should be free of polymers, in order to insure complete aliphatic solubility of the final resin.

The resins thus produced are recovered by simply sparging first with inert gas and finally with steam. This eliminates time consuming neutralization of other types of catalysts. The resin mix is first inert gas sparged to a temperature of 220° C. and then steam sparged to a temperature of 250° C. It is held at 250° C. and continuously sparged till a ratio of water to oil in the distillate is 19:1.

In this way, there are produced water white copolymers of color less than 1 on the Gardner scale, that are soluble, even down to 0° C., in low odor mineral spirits such as Chemsol 143,[1] or in low-kauri-butanol solvents such as Stoddard solvent.[2] These resins are, as indicated above, of 10° C. to 140° C. softening points with the generally preferred grades being 100° C., 115° C. and 120° C. This combination of properties adapts them to a variety of uses including by way of example, hard drying overprint varnishes, pressure sensitive tapes, chewing gum, adhesives and xerographic coatings.

As examples of the invention, the following are offered:

EXAMPLE I

|   | Parts by weight |
|---|---|
| Alpha methyl styrene | 990 |
| Vinyl toluene | 1860 |
| 2-ethyl hexyl acrylate | 150 |
| n-Dodecyl mercaptan | 15 |
| Triphenyl phosphite | 3 |
| Solvesso 150 | 450 |

---

[1] Chemsol 143 is an essentially aliphatic solvent boiling between 364 and 400° F. with a 30 Saybolt color, a 142° F. flash point, a mixed aniline point of 142° F. and a specific gravity of 0.7835.

[2] Stoddard solvent is an essentially aliphatic solvent boiling between 300 and 400° F. with a 30 Saybolt color, a specific gravity of approximately 0.792, a flash point of 108° F. min. and a mixed aniline cloud point of 133° F.

All of the foregoing were charged to a 5 liter flask equipped with a heating mantle, reflux condenser, thermometer, inert gas and stirrer. While stirring the system was purged with nitrogen for 15 minutes. The temperature was then raised to 138° C. in 45 minutes; at this point an initial exotherm took over that peaked at 165° C. in 30 minutes. At this point heat was slowly applied as the temperature was increased to 180° C. in one hour. Refluxing occurred that automatically controlled the temperature rise. At 180° C. a second exotherm occurred, all heat was cut off and the temperature climbed to 190° C. At this point heat was reapplied and because of refluxing slowly raised to 198° C. over a period of 1½ hours. When the reaction mixture reached 198° C. there was very little reflux. The mixture was then gas sparged to a pot temperature of 220° C. and steam sparged to a temperature of 250° C. The steam sparging was continued till a water to oil ratio in the distillate reached 19:1.

At this point, the resin was poured, to provide a water white, aliphatic soluble resin with a ring and ball softening point of 140° C. and in a yield of 87% based on the monomers. The resin had a specific gravity of 1.04, an acid number of 0 and Wijs iodine number of 3.0 indicating excellent oxidative stability.

EXAMPLE II

The resin made in Example I was repeated, but just prior to pouring, 150 grams of dihexyl phthalate was added to the molten resin and thoroughly mixed in. The resultant resin was poured to provide a resin with the same physical properties with the exception of exhibiting a 120° C. softening point. In fact, we found that in the case of the base resin as produced in Example I, every 1% dihexyl phthalate added gave a reduction in melting point of 4° C. We could thus produce any melt point desired.

EXAMPLE III

| | Parts by weight |
|---|---|
| Vinyl toluene | 1860 |
| Alpha methyl styrene | 990 |
| 2-ethyl hexyl acrylate | 150 |
| Methacrylic acid | 150 |
| Solvesso 150 | 450 |
| Triphenyl phosphite | 3 |
| n-Dodecyl mercaptan | 15 |

This mix was charged and run exactly like Example I. The resultant resin was water white, obtained in 89% yield, and had a softening point of 155° C. We found that this polymer responded to softening point depression with dihexyl phthalate at the rate of 3° C. for every 1% added. The resin at 120° C. had an acid number of 30 and a specific gravity of 1.03. It was soluble in aromatics, aliphatic-alcohol mixtures and was compatible with ½ second nitro-cellulose.

EXAMPLES IV-V

| | Parts by weight | |
|---|---|---|
| | IV | V |
| Styrene | 930 | 1,860 |
| Vinyl toluene | 930 | |
| Alpha methyl styrene | 990 | 990 |
| 2-ethyl hexyl acrylate | 150 | 150 |
| n-Dodecyl mercaptan | 15 | 15 |
| Triphenyl phosphite | 3 | 3 |
| Solvesso 150 | 450 | 450 |

Both of the foregoing resins were run the same as Example I. Resin IV was obtained in 89% yield, water white in color and required a 50 K.B. solvent to dissolve it. Resin V required a minimum 90 K.B. solvent for solution. The resin was water white and obtained in 89% yield.

According to the provisions of the patent statutes, we have explained the principles of our invention and have described what we consider to be its best embodiments. However, we desire to have it understood that within the scope of the appended claims, the invention may be practiced otherwise than as specifically described.

We claim:

1. A method of producing a resin comprising reacting (A) a mixture of monomers consisting essentially of from (1) about 30%–40% by weight of alpha methyl styrene, (2) about 50–60% by weight of a member of a group consisting of vinyl toluene and styrene and mixtures thereof and (3) about 2%–15% by weight of at least one member selected from the group consisting of acrylic esters of saturated aliphatic alcohols having 2–18 carbon atoms, methacrylic esters of saturated aliphatic alcohols having 2–18 carbon atoms, acrylic acid, methacrylic acid and mixtures thereof, with (B) about 0.1% triphenylphosphite and about 0.5% dodecylmercaptan in an inert solvent, thus achieving a thermocatalytic polymerization and thereby producing a resinous interpolymer of said monomers, and recovering said resinous interpolymers.

2. A method as defined in claim 1 wherein (2) is vinyl toluene.

3. A method as defined in claim 1 wherein (2) is a mixture of vinyl toluene and styrene.

4. A method according to claim 1 wherein said inert solvent is free from resin forming compounds and wherein the monomers are free of polymers for the initial use and wherein said solvent may be reused with no detrimental effect.

5. A method according to claim 1 wherein said solvent is an aromatic hydrocarbon.

6. A method according to claim 1 wherein said solvent is an aliphatic hydrocarbon.

7. A resin, prepared according to the method of claim 1, being of light color and having a softening point of about 140° C.

8. The resin of claim 7 softened by the addition of a phthalate plasticizer, and having good solubility in low odor mineral spirits and in low butanol solvents.

References Cited

UNITED STATES PATENTS

| 2,987,508 | 6/1961 | Ruffing et al. | 260—80.81 X |
| 3,168,502 | 2/1965 | Sexsmith et al. | 260—80.81 X |
| 3,222,328 | 12/1965 | La Combe et al. | 260—80.8 X |

MORRIS LIEBMAN, *Primary Examiner.*

L. T. JACOBS, *Assistant Examiner.*

U.S. Cl. X.R.

260—33.6, 80.78, 80.8, 80.81